United States Patent [19]

Caldwell

[11] 3,729,052
[45] Apr. 24, 1973

[54] HYDROTHERMAL TREATMENT OF SUBSURFACE EARTH FORMATIONS

[76] Inventor: Lyle Caldwell, 2311 Alto Oak Drive, Los Angeles, Calif. 90028

[22] Filed: June 15, 1971

[21] Appl. No.: 153,393

Related U.S. Application Data

[63] Continuation of Ser. No. 32,400, April 27, 1970, abandoned, which is a continuation-in-part of Ser. No. 824,371, May 5, 1969, abandoned, which is a continuation of Ser. No. 666,470, Sept. 8, 1967, abandoned.

[52] U.S. Cl. ................166/283, 166/292, 166/281
[51] Int. Cl. ...........................E21b 43/02, E21b 43/26
[58] Field of Search....................166/276, 278, 280, 166/281, 283, 292, 293, 308, 300; 252/8.55 R, 8.55 D

[56] References Cited

UNITED STATES PATENTS

| | | | |
|---|---|---|---|
| 2,955,653 | 10/1960 | Cain | 166/278 |
| 3,244,229 | 4/1966 | Hujsak et al. | 166/276 |
| 2,978,024 | 4/1961 | Davis | 166/278 |
| 2,452,654 | 11/1948 | Hayes et al. | 166/278 |
| 2,933,135 | 4/1960 | Johnson | 166/283 X |
| 3,070,160 | 12/1962 | Reistle | 166/281 |
| 3,455,390 | 7/1969 | Gallus | 166/308 X |
| 3,000,818 | 9/1961 | Abbott | 252/8.55 R |

OTHER PUBLICATIONS

Knibbs, Lime and Magnesia, N.Y. Van Nostrand, 1924, page 41 relied on.

*Primary Examiner*—Stephen J. Novosad
*Attorney*—William H. Pavitt, Jr. et al.

[57] ABSTRACT

A consolidated, permeable mass of siliceous material is formed within a permeable, subsurface earth formation or in the well bore penetrating such formation, in order to control loose or unconsolidated sand present in such formation, by injecting and displacing into the formation an aqueous solution substantially saturated with an alkaline earth metal hydroxide or compounds which form the same in situ, by reacting with each other or with a material present in the formation, and maintaining the solution in the formation for a time and at a temperature sufficient to form such consolidated, permeable mass from siliceous materials present in the formation, or a siliceous material is added to the solution and the solution is disposed in the well bore, in cavities or openings in the formation or in fractures in the formation for a time and at a temperature sufficient to form such consolidated, permeable mass.

11 Claims, No Drawings

HYDROTHERMAL TREATMENT OF SUBSURFACE EARTH FORMATIONS

CROSS-REFERENCES TO RELATED APPLICATIONS

This application is a continuation of U. S. Pat. application Ser. No. 32,400, filed Apr. 27, 1970, now abandoned, which was a continuation-in-part of U. S. application Ser. No. 824,371, filed May 5, 1969 and entitled "Hydrothermal Treatment of Earth Formations," now abandoned, which was a streamlined continuation of application Ser. No. 666,470, filed Sept. 8, 1967, entitled "Hydrothermal Treatment of Earth Formations," also now abandoned.

BACKGROUND OF THE INVENTION

Two of the major problems facing the oil industry for a number of years have been the production of sand from subterranean earth formations along with desired fluids, such as oil, gas and water, and the plugging of such formations with siliceous materials, thereby reducing the production capacity of the permeable formation or the infectivity of fluids, such as water, gas, etc. into such formations.

Sand production along with desired fluids from subsurface earth formations causes numerous operating problems. For example, the sand erodes metallic producing equipment, fills producing tanks and surface flow lines, damages pumps, and fills the subsurface production string thereby interrupting or reducing production and necessitating frequent removal of the sand.

Sand production along with the production of desired fluids as well as formation plugging by siliceous particles usually results from lack of natural cementing materials in the formation which normally hold individual sand grains together. Such lack of natural cementing may be due to the dissolving action of water (the problem is usually most severe in wells making considerable amounts of water) and/or mechanical breakdown resulting from impingement of flowing formation fluids or the effect of pressure differentials near the well bore. Sand problems are often aggravated in well treating operations, such as hydraulic fracturing, wherein sand is injected into fractures using aqueous fluids as a carrier; other well treatments, where an aqueous acid solution is injected into the formation, such as acidizing to remove emulsion blocks, dissolve selected formation materials or plugging materials, reduce drilling mud damage, etc., or where an aqueous non-acid solution is injected to remove emulsion blocks, or as a preflush or spearhead in advance of cement, plastic, or propping sand, etc.; and in secondary recovery operations utilizing water or steam as an injection fluid.

It is generally believed that the previously mentioned natural cementing materials are siliceous or clay materials which are relatively unstable compared to other types of subsurface earth formations, and particularly in the presence of water. Typical minerals comprising such clays include kaolinite, halloyside, montmorillonite, illite, etc. Such clays usually contain other minerals including quartz, calcite, limonite, gypsum, and muscovite. In any event, such materials are normally alumina, silica, compounds of the same, or these materials in admixture with silicates.

Methods of sand exclusion were first used in water wells and were later applied to oil and gas wells with varying degrees of success. Most of these methods endeavor to set up an artificial barrier around the well bore that will be permeable to liquids but impermeable to solid particles. Thus, sand migrating to the well bore is retained without interfering with production of well fluids. Sand control methods may be divided into two main categories.

The oldest of these methods is to pack the well bore with coarse sand or gravel to hold back the finer formation sands. Slotted or perforated metal screens have also been employed for this purpose. A more recent method consists of packing the well with unset, plastic-coated sand grains or walnut shells which, upon the setting of the plastic, form a consolidated network that acts as a barrier to loose formation sand. Disadvantages of these methods include the fact that extremely fine formation sands may penetrate the barrier and in time erode passages therethrough, thus allowing unhampered sand production and requiring other remedial work.

In contrast to these bridging-type methods, liquid sand consolidation plastics have been pumped into unconsolidated sands to thereby form a consolidated, plastic matrix. There the plastic polymerizes and hardens, cementing individual sand grains together into a rigid mass, yet preserving sufficient permeability for production or injection of fluids. The use of sand consolidation plastics requires no permanent down-hole equipment. The sand is retained in place in the formation and the success of the job does not necessarily depend upon the efficiency of a screening barrier. Sand consolidation plastics are usually chemically inert and are unaffected by oil, gas or water. However, such sand consolidation methods also have their drawbacks in that the plastic is usually expensive, only limited amounts of the plastic are usually used thereby treating only a very small portion of the formation surrounding the well bore, severe problems can occur due to premature setting of the plastic, the procedure for application is complicated, most plastics are not recommended for use above 200°F or where the clay content of the formation exceeds 15 percent, the treatment is usually shortlived, and, even though the sales literature on plastic treatments claims a retention of formation permeability as high as 85 percent, industry experience indicates this figure is generally between 10 and 50 percent.

Sand control methods which form a permeable screen or barrier at the face of the subsurface formation or a shallow permeable consolidated section in the formation adjacent the well bore are not to be confused with temporary or permanent plugging techniques utilized during the drilling, completion, or workover of a well penetrating subsurface formations. In the latter cases, a permanent or temporary seal over the face of the formation is to be produced or a permanent or temporary plug within the formation adjacent the well bore is to be produced.

For example, in drilling operations, drilling muds carrying various clay materials or the like are utilized in order to maintain the well under control (prevent blowout of fluids from subsurface formation containing fluids under pressure), and to form a mud sheath or mud cake on the surface of permeable formations and thereby prevent the loss of drilling fluids into porous formations. Similarly, materials are also added to drilling muds to prevent sloughing or caving of impermeable formations such as shale formations. Where the mud cake or mud layer on the surface of a permeable formation is utilized as a control, this is usually a temporary plugging action since it may be desired that fluids be produced from or injected into a permeable formation or that mud cake be removed prior to cementing, etc. Similar temporary plugging agents are also utilized as well control fluids when wells are to be worked-over to change the producing interval, remove debris, replace equipment, etc.

Permanent plugs, either on the surface of a formation surrounding the well bore or within a section of the formation adjacent the well bore are usually utilized to prevent the production of fluids such as water from formations adjacent oil-producing formations or to prevent injection fluids from migrating from the formation into which they are being injected and into adjacent formations. Such plugging agents can include cement-type materials, insoluble plastics and the like.

It is therefore an object of the present invention to provide an improved technique for consolidating siliceous, unconsolidated materials in or adjacent a permeable subsurface earth formation.

Another and further object of the present invention is to provide a technique for forming a permeable mass of siliceous material in or adjacent a permeable subsurface earth formation.

These and other objects of the present invention will be apparent from the following description.

SUMMARY OF THE INVENTION

In accordance with the present invention, a permeable consolidated mass of siliceous material is formed within or adjacent a well bore penetrating permeable subsurface formations by injecting or forcing into the permeable subsurface formation an aqueous solution substantially saturated with an alkaline earth metal hydroxide or a mixture of materials which will form an alkaline earth hydroxide in situ, either by reaction among themselves or with a material present in the permeable subsurface formation, at a pressure sufficient to displace the injected fluid into the permeable subsurface formation or by disposing such aqueous fluid and siliceous solids in a cavity or openings in the permeable formation or depositing the same in a fracture in such formation. In either case, a sufficiently high temperature is maintained for a time sufficient to form a consolidated mass of such siliceous materials. The aqueous solution of alkaline earth hydroxide may contain other compounds which will improve the solubility of the alkaline earth hydroxide in the aqueous solution without materially inhibiting the consolidation reaction. Where the aqueous alkaline earth hydroxide solution is to be disposed in a cavity or openings in the permeable formation or injected into a fracture, such solution may also contain sufficient siliceous materials to form a consolidated, permeable body of siliceous materials.

DETAILED DESCRIPTION OF THE INVENTION

Where the term "permeable subsurface earth formation" is utilized herein, such term is meant to include permeable sandstone, limestone, and dolomite formations. The terms "permeable" or "permeability" are meant to cover interconnected pores or fractures in such sandstone, limestone or dolomite formations which are therefore capable of transmitting liquids or gases through the formations as opposed to formations with disconnected pores or which are devoid of pores, such as shale formations.

The term "unconsolidated" shall mean that condition of a subsurface earth formation or a body of particle-form material in which particles of siliceous materials, particularly sand grains, are loose, soft or incompetent to the extent that they do not maintain essentially their same physical position with respect to other particles under the operating conditions of fluid flow, etc. to which the formation is subjected. The term "consolidated" shall means that condition of a subsurface earth formation in which said particles of siliceous materials, particularly sand grains, are formed or agglomerated into a permeable mass whose particles maintain essentially the same physical position with respect to the other particles under the operating conditions of fluid flow, etc., to which the formation is subjected.

In the preferred technique in accordance with the present invention, the permeable subsurface formation to be treated in accordance with the present invention will normally contain fluids such as water, oil, gas, or mixtures thereof, to be produced through the well penetrating the formation, or fluids such as water, steam, gas, etc., are being injected into the formation to displace the desired fluids from the formation toward a second well or wells penetrating the formation at another location or to heat the formation fluids and aid their flow. In carrying out the treatment in accordance with this embodiment, the treating solution of alkaline earth hydroxide is injected or forced at a pressure and in a volume sufficient to deposit a substantial volume of the solution in the formation and generally to displace at least a part of the fluids in the permeable formation and replace the same with the treating solution for a considerable distance surrounding the well bore through which treatment is carried out.

Such injection may be carried out by conventional pumping or injection procedures that involve exerting pressure at the well head. After the desired volume of solution has been injected into the formation, a pressure differential is maintained on the solution for a time sufficient to allow the bonding reaction to take place. This period maintains the sand particles in a quiescent condition during completion of the bonding, and may, according to temperatures existing in the formation, be from about one day to several days, perhaps as long as two weeks or more.

The volume of treating solution will obviously depend upon the vertical thickness of the subsurface formation, the porosity of the formation and, in some cases, the residual oil value for the formation. The volume of treating solution will also vary to some extent based on the concentration of active ingredients in the solution. Hence, a better criterion is the radial depth of penetration of the treating solution into the formation. In all events, a volume of treating solution and a pressure sufficient to inject the treating solution into the formation for a radial distance substantially in excess of the radial distance penetrated during the accidental leak-off of well treating fluids. For example, it is well established that, in formations of average permeability, the radius of penetration of drilling fluid filtrate is about two feet while in more permeable zones the penetration or invasion is a maximum of about seven to eight feet. See B. J. Service "Bulletin No. BJ 1-67-1AA," pp. C-1 and C-2; *Petroleum Engineering* by Carl Gatlin, Prentice-Hall, Inc., 1960, pp. 245-46.

The same principles apply and the same depths of penetration due to accidental leak-off occur when one utilizes well completion or workover fluids or fluids to seal off incompetent formations, such as sloughing shales. Specifically, a volume of treating solution and a pressure sufficient to inject the treating solution into the formation for a radial distance of at least about 10 feet should be utilized. Preferably, the radial depth of penetration should be about 20 feet. The latter corresponds to a volume of treating solution of about 30 barrels per foot of vertical thickness for formations of average porosity and residual oil, such as those previously mentioned. It should also be noted here that the radial depth of penetration of the solution of the present invention also far exceeds the depth of penetration of conventional sand consolidation plastics. Hence, a substantially larger volume of the formation can be treated with the consequent improved results.

In another mode of operating in accordance with the present invention, the permeable formation being treated is actually cracked or fractured and the crack or fracture treated in accordance with the present invention. Such fracturing is a well-known oil field technique for increasing the permeability of permeable subsurface formations and thus improving the flow of fluids therethrough. This technique is adequately set forth in original U. S. Pat. No. 2,596,843. Very briefly, it involves injecting into the permeable formation a sufficient volume of fluid at a sufficient pressure to not only displace fluids contained in the formation and replace them with the injected fluid, but also sufficient to actually crack or fracture the permeable formation. This cracking or fracturing of the formation is generally recognized by a drop in pressure at the well head. In most cases, once the break or fracture is created, a zone of increased permeability is obtained by thereafter injecting into the fracture a liquid-carried solid propping agent such as sand, etc.

It is obvious that such propped permeable fractures can readily become plugged by crushed particles from the formation or possibly by crushed propping agent or such crushed materials; or uncrushed propping agent may be produced along with fluids during operation of the well. Consequently, it is highly desirable that the present technique can be carried out in conjunction with or as a part of such fracturing treatment. The treatment of the present invention can be carried out at various stages in the fracturing treatment. Specifically, the treating solution of the present invention may be injected into the permeable subsurface formation which is to be fractured prior to the actual fracturing operation, for example, as a "spearhead" or as the actual fracturing fluid. This will consolidate the siliceous materials present in the fracture and prevent their subsequent production through the fracture or the plugging of the fracture by these materials. In a more desirable variation of this technique, the treating solution of the present invention may be injected into a fracture after the fracturing fluid or after propping has taken place. In either case, it may be desirable to add to the treating solution small particles of siliceous materials which will aid the cementing of the propping sand and form a consolidated, permeable mass of propping sand, for example, pozzolana cement, cement clinker, silica flour and the like. This, of course, is vastly superior to simply holding the propping agent in place by the weight of the overburden, as is the current practice, particularly since much of the sand is actually crushed and fragmented as a result of overburden pressure.

The preferred technique involves utilizing the treating solution of the present invention as a carrier fluid for propping sand and the like and adding, if necessary or desired, siliceous materials to the carrier fluid. Finally, a solid, granular material having a sufficient degree of mechanical strength and sufficiently large grain size to act as a propping agent alone or in addition to the propping agent may be disposed in the usual carrier fluid and deposited in the fracture. This solid granular material is one that in the presence of aqueous solutions will give a soluble alkaline earth hydroxide product. The formation of the soluble alkaline earth hydroxide material may also be as a result of the inclusion in the carrier fluid or a solution following the carrier fluid of a material which will react with the solid granular material to form the alkaline earth hydroxide. Where calcium hydroxide is the soluble alkaline earth hydroxide, properly sized Portland cement clinker or a solid containing an ingredient which will react with a material in the treating solution to generate alkaline earth hydroxide, materials in the carrier fluid to generate alkaline earth hydroxide, or materials in a fluid following the carried fluid, to generate alkaline earth hydroxide may be utilized. Solid materials, such as pozzolana, which will assist in forming a permeable matrix, may under reaction conditions, also be introduced in a saturated solution of calcium hydroxide.

In a similar manner, a consolidated, permeable mass of siliceous material can be formed in the well bore opposite the formation in question and/or in voids or openings in the formation by depositing a treating solution containing large sand or gravel and preferably a fine siliceous material in the well bore. This technique is, of course, less desirable because of the limited amount of material which can be utilized to form a permeable consolidated mass. In this technique, a treating solution carrying large size sand plus small size cementing materials such as the siliceous materials, is injected into natural-occurring fractures or perforations in the formation surrounding the bore hole or in a reamed-out or enlarged cavity adjacent the formation or behind a slotted or perforated metal screen adjacent the permeable formation to be treated. In these cases, except for the fact that sand, designed to act as a base for cementitious materials and to form a consolidated mass of the sand, is included in the treating solution, the treatment is essentially the same as previously indicated. In like manner, partially decomposable or soluble solids may be used to form both the cementing material and the permeable matrix.

In any of the procedures which utilize a solid propping agent in a created fracture, or a body of such solid particles are utilized in the well bore or in voids or openings in the formation, it has also been found convenient to utilize glass particles or beads such as those which have heretofore been used as fracture propping agents. These beads are agglomerated together or consolidated by a solution of alkaline earth metal hydroxide without the addition of siliceous materials. Of course, fine siliceous materials can be added if desired.

The mode of introducing the alkaline earth hydroxide in the well bore may also be varied in many ways. It may be in the form of a dry powder, a paste-type aqueous concentrate, a pastetype oil concentrate, similar liquid concentrates, such concentrates with surfactants, suspensions of such materials in oil or water, emulsions of the same, etc. Such powders, liquids or pastes may be added intermittently or continuously to steam or hot or cold water being injected into the formation. The water may be natural formation water or salt or fresh water.

Of the alkaline earth metal hydroxides, calcium hydroxide is preferred because of its low cost and ready availability. Further, it reacts well on the wide range of particulate materials encountered in subsurface earth formations.

Magnesium hydroxide has a much lower solubility in water than does calcium hydroxide, although the solubility can be increased to an acceptable value by adding solubilizing agents. In general, magnesium hydroxide reacts well with the particulate matter and appears to be completely operative within the range of possible concentrations of the solution.

While it would not ordinarily be found preferable to use magnesium hydroxide, it is significant to determine its operability in this connection since commercially available grades of lime often contains some magnesium; and, consequently, the saturated solution prepared from these commercially available grades of lime may contain small amounts of magnesium hydroxide.

Likewise, the hydroxides of barium and strontium are operative under some conditions. Since the solubility of these two compounds increases with an increase in temperature, the solution introduced into the well may not be a completely saturated solution at the temperatures reached in the ground, even though it is saturated at the time and place of introduction. Both of these hydroxides have the disadvantage that the starting materials are relatively expensive and not always easily available.

Since the solubility of calcium hydroxide in pure water is comparatively low (1.16 g as CaO/liter of saturated solution or 0.116 percent by weight at 30°C) and it is desirable to introduce into the formation as much of the reagent as possible for a given volume of water, it is preferred to add to the aqueous solution another compound which increases the solubility of calcium hydroxide and is compatible with the objectives of the invention. The result is a greater concentration of calcium hydroxide in solution at saturation. As used herein, the term "saturated" includes a saturated solution having an excess of calcium hydroxide appearing as a suspension of the solid phase.

One group of such solubility increasing compounds are inorganic salts that are soluble in water and do not produce an insoluble precipitate with the calcium hydroxide. Included in this group are various calcium, sodium and potassium salts, such as the chlorides, nitrates, nitrites, organic salts such as acetates, and so on. Sodium chloride has been found to be effective for this purpose and is preferred because of its low cost and ready availability.

In general, the added inorganic salt may be present in a range up to 16 to 20 percent in concentration, the optimum value depending on the compound added as each one differs in its effect on solubility of calcium hydroxide. Within this range, salts added have been found under laboratory conditions to increase the solubility of calcium hydroxide by a factor of 1.5 – 2.5 and to increase the speed of action of the calcium hydroxide on the siliceous particles by a factor of three or more. When sodium chloride is the added salt, a preferred concentration is about 3 percent sodium chloride. Optimum results are obtained with a concentration of 3 to 6 percent of sodium chloride, as above this latter value, the solubility of calcium hydroxide has only a negligible increase with an increase in the concentration of sodium chloride.

A second group of compounds which has been observed to both increase the solubility of calcium hydroxide and to accelerate the rate of action on the siliceous particles are certain water soluble organic compounds.

While various organics have demonstrated their ability to increase the solutility of calcium hydroxide in water, only glycerol has enough influence in this respect to be of concern here.

Glycerol has been found to increase the solubility of calcium hydroxide and to offer no hindrance to its action on the siliceous particles. For this purpose, a concentration of as much as 6 percent in water has been found to operate satisfactorily.

It has been found that a minimum pH value of about 10.5 is required for satisfactory speed of action of the calcium hydroxide on the siliceous materials and a higher concentration of a material which reduces the pH below this value and interferes with the action. Generally speaking, any solution of calcium hydroxide should have a pH value of about 10.5 or numerically higher for best results.

There have been discussed above various additives designed to increase the solubility of the alkaline earth metal hydroxide in water. The invention is not necessarily limited to the use of a single one of these compounds for this purpose, as various combinations of these additives may be employed in order to increase solubility. As an example, but without limitation thereto, laboratory tests have been performed using 6 percent glycerol plus 3 percent sodium chloride. In all cases, an increase in the solubility of the hydroxide was observed without any apparent unfavorable influence on the rate or extent of the action of the hydroxide with the siliceous particles. In some situations, there may be distinct advantages in combining these various solubility-increasing compounds.

It is obviously preferable to prepare the saturated solution of calcium hydroxide, together with any additives desired in the solution, at the ground surface and then to pump the solution down the well. However, less desirable technique, within the scope of the present invention, is to prepare the saturated solution at the site of its use. For example, a solution of calcium chloride can be pumped down the well and then followed by a solution of sodium hydroxide. Chlorides are highly soluble, and the first solution will penetrate into the formation without forming any precipitate which would impede its penetration into the formation. Followed by sodium hydroxide, the two aqueous solutions would react in place in the earth formation to form sodium chloride and calcium hydroxide. The concentration of the two solutions would preferably be calculated with the expectation of producing a saturated solution of calcium hydroxide in the formation, which would then contact and act upon the siliceous particles in the same manner already described, as if the solution of calcium hydroxide had been introduced as such into the formation. Obviously, two such reactable materials may be included in a single solution. Solid materials which at least partially decompose or are at least partially soluble in water, such as cement clinker, dead burned dolomite, etc., can also be used to form the hydroxide in situ. Obviously, if the solid material is not completely decomposable or soluble, the unchanged portion will also serve as a permeable matrix in an enlarged section of the bore hole or in formation fractures. While the preferred method as described above has obvious advantages, it will be apparent that the present invention is not necessarily limited to producing the hydroxide solution in a particular manner.

The addition of a surfactant that reduces surface tension and acts as a wetting agent to increase contact of the reagent solution with the siliceous particles is also contemplated herein. Such surfactant may also be included in a "preflush" solution in advance of the treating solution or other known preflush agents such as isopropyl alcohol, glycols, ethers, etc., may be used in a preflush or "spearhead" type of operation.

Applicant does not offer any precise theory of the action of the calcium hydroxide on the siliceous particles; but in all probability, the calcium hydroxide forms a coating on the particles as well as combines with the silica and/or alumina of the particulate matter to form a hydrated calcium silicate and/or calcium aluminate coating on the surface which assists in consolidation of the particles. This causes a change in the loose or compacted volume of the particles, possibly because of a more highly hydrated condition of each particle but also because of the apparent cementing action of the previously mentioned coating materials. Clay particles so treated do not tend to form a slimy, gelatinous mass as do untreated particles but rather maintain themselves in a permeable agglomeration.

Laboratory tests using clay such as kaolin, montmorillonite, hectorite or extremely fine solid minerals such as quartz particles in the 10 – 30 micron size range or fine mica, opaline silica, and various other minerals of the same particle size, when contacted with calcium hydroxide solution have all shown, under reaction conditions, a substantial volume increase. Usually this volume increase is of the order of 2:1 or greater. This is true both in the loose settled state in a liquid and when compacted under static fluid pressures of the order of magnitude of those encountered in deep oil wells, for example 12,000 psi.

Comparative filtration rates have been run on the above test materials under laboratory conditions to determine the relative permeability of such materials before and after treatment with calcium hydroxide. Once having been formed as a filter cake, of even a few thousandths of an inch in thickness, over a porous filter bed such as fine sand, most of the above fine materials prior to treatment do not permit the passage of any substantial quantity of fluids, either oil or water, such as are encountered in a subsurface formation. On the other hand, a similar filter cake formed in a similar manner with the same minerals after being treated by contact with calcium hydroxide, and formed into a filter cake over a filter bed such as a fine sand, have been found to permit passage of fluids, both oil and water carrying the treated solids in suspension, and continued to build up a thick filter cake which is porous and fluid permeable. The treated particulate matter has been found to remain permeable to fluids even when increased to a thickness of as much as two inches. The rate of fluid flow through a bed this thick greatly exceeds the flow rate through untreated particulate matter only a few thousandths of an inch thick, such as a drilling fluid mud cake. As previously indicated, such filter cakes serve as a desired seal on the formation face during drilling and passage of fluid therethrough is undesirable.

By way of example, the table below shows the results of three different tests for comparative filtration rates on two comparable samples of particulate material, one treated and the other untreated. The procedure followed in each of these cases was to weight two equal samples of a selected material. Each sample was then shaken in about 30 cc. of liquid. One sample was placed in a 6 percent aqueous solution of sodium chloride as a control. The other sample for comparison purpose was then placed in a saturated solution of calcium hydroxide to which had been added a salt, as state below. The two samples were then placed in an oven and maintained at a uniform temperature of 150°F. until substantial equilibrium had been reached in the second sample, as determined by visual inspection. This latter event was indicated when the reacted particles agglomerated into large, irregularly shaped flocs and settled in less than ten seconds after shaking into a porous mass leaving a clear solution above.

Then, the samples were drawn from the oven and the containers shaken vigorously to resuspend all of the particulate matter. To determine the relative filterability of the treated and untreated particulate matter, liquid was drawn off from the sample containers under a vacuum equivalent to 26 inches of mercury. The time in seconds required to withdraw measured volumes of 5, 10, 15, and 20 cc. of filtrate from each of the sample containers was observed. The liquid was withdrawn through a perforated plate covered with a filter paper on which the particulate matter was retained in a layer of comparatively uniform thickness.

In the comparative tests noted in the following table, the first was conducted with less than 160 mesh mica. The samples weighing 0.1 gram was placed in 30 cc. of water to which 6 percent by weight of sodium chloride was added before saturation with calcium hydroxide. The second test was made with less than 325 mesh kaolin, the samples each amounting to 0.05 gram in 30 cc. of water also containing 6 percent sodium chloride before saturating with calcium hydroxide. The third comparison test was made with less than 325 mesh silica of which the samples were 0.05 gram contained in 30 cc. of water to which 6 percent sodium chloride had been added in order to increase the solubility of the lime in the solution. The last test was with equal sizes of samples of the same silica material but to which 3 percent of calcium acetate was added to increase solubility of the hydroxide.

In the following table, the figures given represent the time in seconds required to withdraw the measured amounts of liquid from the sample containers.

TIME IN SECONDS TO WITHDRAW MEASURED VOLUMES OF FILTRATE

| Volume | Without lime, cc. | | | | Saturated lime solution, cc. | | | |
|---|---|---|---|---|---|---|---|---|
|  | 5 | 10 | 15 | 20 | 5 | 10 | 15 | 20 |
| Material: | | | | | | | | |
| 1. Mica | 40 | 95 | 165 | 245 | 14 | 28 | 48 | 70 |
| 2. Kaolin | 75 | 250 | 500 | 750 | 12 | 28 | 36 | 47 |
| 3. Silica | 120 | 300 | 520 | 800 | 9 | 19 | 29 | 39 |
| 4. Silica | 68 | 180 | 290 | 420 | 11 | 23 | 35 | 48 |

The above laboratory tests were run using aqueous solution as the liquid because of the safety and convenience afforded in using this fluid medium.

From the times given in the above table, it will be observed that the filtration rates are substantially higher with each of the three materials considered when these particles have been converted by contact with the saturated solution of calcium hydroxide. This is indicated by the relatively shorter elapsed time required to pass each of the measured volumes of filtrate through the bed of treated or converted particulate material retained on the filter. It is also noteworthy that in the case of untreated material, each incremental volume of 5 cc., after the initial 5cc. volume, requires a greater time to pass through the filter than does the initial volume. This indicates that the accumulated cake has a greater resistance to fluid flow when the particles are untreated while after treatment the increasing thickness of filter cake offers comparatively little increase in resistance to fluid flow. Thus, it is concluded that treatment of the particles in the manner described operates to preserve their permeability to fluid flow by converting them into a comparatively rigid permeable mass through which fluids pass with comparative ease.

The preferred alkaline earth metal hydroxide of the present invention is calcium hydroxide. The calcium hydroxide should be present in the aqueous solution in an amount sufficient to create a saturated or supersaturated solution. The hydroxide acts upon the siliceous materials in the formation to produce a highly permeable, consolidated mass of such materials. It has also been found that this action of the hydroxide on the siliceous materials is a function of temperature and time. The length of time required for the reaction to take place is also interrelated to the temperature. For example, it has been found under laboratory conditions that the action takes place slowly at about 70°F, requiring several days. However, the reaction rate is increased materially by increasing the temperature so that at about 150°F the reaction rate has increased to the point that a consolidated mass is formed in about 20 hours. It is also therefore necessary to maintain the solution in the formation for a period sufficient to complete the consolidation. At a common bottom hole temperature of about 170°F, maintaining the treating solution in a quiescent state for 1 or 2 days, or longer, produces a permeable consolidated mass of siliceous materials which will remain competent underoperating conditions. The time which the solution should remain quiescent has also been found to be even shorter at temperatures of about 212°F. The temperature should be maintained below a temperature at which substantially all siliceous material goes into chemical combination with the calcium hydrate. If substantially pure silica and calcium hydrate are used, this temperature is about 425°F. While, as indicated, appropriate temperatures can be attained as a result of heat absorption from the subsurface formation, the temperature can be supplied by heating the treating solution itself or by heating a well control fluid disposed in the well ahead of or after the treating solution.

In the course of experimental and test work, tests have been conducted in a number of wells located in various areas chosen because of unfavorable sanding conditions in the wells. In the test wells various techniques and changes in conditions were tried on an experimental basis. Pertinent treatment conditions and results obtained in a few of the test wells are summarized in tabular form in the following table:

TABLE I

| Test number location date | Maximum depth (feet) | Production zone thickness (feet) | Barrels of water injected | Calculated penetration (feet) | Temperature at injection, °F. | Quantity of active reagent (pounds) | Well head pressure (p.s.i.) | Treatment time (days) |
|---|---|---|---|---|---|---|---|---|
| #1, Midway-Sunset Field, California | 1,450 | 400 | 10,700 | 18 | 450 | 440 | 400 | 14 |
| #2, S. Belridge Field, California | 1,115 | 547 | 10,000 | 16 | 425 | 560 | 550 | 14 |
| #3, Midway-Sunset Field, California | 1,526 | 351 | 6,800 | 17 | 425 | 260 | 475 | 7 |
| #4, San Ardo Field, California | | 100 | 14,000 | 43 | 450 | 560 | 550 | 28 |
| #5, Golden Lake Field, Canada | 1,679 | 26 | 3,000 | 50 | 290 | 180 | 185 | 10 |

The table shows the quantity of active ingredient $Ca(OH)_2$, and the quantity of hot water, either as hot water or as steam converted to an equivalent volume of hot water, injected into each test well. The pressure at the well head applied to inject the solution into the production zone is also given for each well. This pressure was sufficient to drive the treating solution back into the producing formation thereby replacing displaceable oil and gas by the injected solution, the purpose being to force the solution into portions of the production zone relatively remote from the bore hole.

While actual penetration of the subterranean formation cannot be determined, a theoretical penetration can be calculated based upon the vertical thickness of the production zone and the volume of solution injected, and upon the assumption that the solution radiates outwardly in all directions from the bore hole at an equal rate and uniformly over the total interval.

Assumptions used in calculating the radius of treatment of the formation, which is the value in column 5 of Table I, are as follows:

Porosity equals 25 percent

Volume filled by the solution equals pore volume minus residual oil in the amount of 30 percent of the pore volume.

The penetrated volume of formation for California producing sections is assumed to be through permeable intervals which make up 70 percent of the gross interval (production zone of the above table) open to the well bore; and it is further assumed that in the permeable zones the injected treatment fluid will fill 70 percent of the permeable producing formation volume. Based upon these assumptions, the theoretical radius' of penetration from the bore hole is shown in the accompanying table.

These calculations have been with the above factors assumed to be applicable over the total producing zone treated. It should be noted that because of variations in permeability, the injected fluid will penetrate further from the well bore in the more permeable intervals than in the less permeable intervals so that in actuality the uniformity of penetration of the treating fluid depends upon uniformity of permeability of the producing formation. However, assuming uniform permeability, the following relation exists between the volume of fluid injected and the calculated radius of penetration.

| Radius of penetration | 5' | 10' | 15' | 20' | 25' | 30' | 35' |
|---|---|---|---|---|---|---|---|
| Barrel treatment, per foot of zone | 1.875 | 7.5 | 16.875 | 30 | 46.875 | 72.5 | 91.875 |
| | 40' | 45' | 50' | | | | |
| | 120 | 151.875 | 187.5 | | | | |

Referring to Table I, in test well No. 1 records show that the well had sanded at least 30 times in the 24 months prior to treatment of the well according to the present invention. Because of sanding, a total of 1539 feet of sand were removed from this well prior to treatment. After treatment with solution according to the present invention, there has been no significant sanding and the well has remained in operation for a total period of 28 months, the only interruptions in production being attributable entirely to causes other than sanding. It has been found that the monthly rate of oil production has been approximately doubled by the injection treatment.

In test well No. 2, severe sand and water problems had been encountered prior to treatment of the well in accord with the present invention. These problems were so severe that they made the well unprofitable and the well was being considered for abandonment. Sand was cleaned out once, 2 months after the treatment, and production of oil has continued since that time without any sand problem. After cleaning out the sand, this well was put on the pump and produced 200 barrels of water and 150 barrels of oil per day, production later rising to 300 barrels of water and 300 barrels of oil per day. Although daily fluid production fluctuates and it has been found necessary to steam this well since that date, oil production has continued at a higher rate since the date of treatment than before such treatment.

In the case of test well No. 3, records show that it was necessary to bail sand out of this well approximately four times a year, or every 3 months. Since the treatment, the well has been bailed only twice to remove sand, the amount on the second bailing being substantially less than on the first. Since then, the well continues on production with a markedly lower rate of production of sand.

Severe sand problems were also encountered in the case of test well No. 4. Records show that sand was removed twice from this well in the two months prior to treatment of the well according to this invention. Since treatment, the well has been in steady production and has shown no sanding of significance in a period of more than 14 months.

In test well No. 5, severe sand problems were also encountered. Prior to treatment in accord with the present invention, sand production varied from 0.4 percent to as high as 5 percent, whereas after treatment sand production was lowered into the range of 0.2 to 1.2 percent. After being pumped with these low rates of sand production, the amount of sand suddenly increased to 4 percent and the well ceased to produce. This well is one of a group of four producing wells of a five-spot pattern being produced under drive provided by fire flood. The production of gas and oil from the entire pattern was largely through the one well; and it is believed that the formation finally broke down at the high production rates and caused the sudden sanding, after which production ceased. For the most recent production month, the average daily production was 76 barrels of oil and 65 barrels of water, whereas in the approximately 6-week period following treatment, production rose to a daily maximum of 430 barrels of oil and 212 barrels of water, with only 0.3 percent sand. Production rates fluctuated in this well for reasons not known, but total production between periods of treatment was approximately four times as great after treatment.

What is claimed is:

1. A method for treating sanded oil wells by agglomerating and increasing the size of finely divided discrete siliceous particles that are free to move in a subsurface earth formation to convert the finely divided particles to an agglomerated condition such that the particles are increased in size and do not move to form a close-packed obstruction which impedes the flow of oil from the formation to a producing well, said method comprising:

injecting into a well bore penetrating the formation an aqueous solution which contains an alkaline earth metal hydroxide;

exerting a pressure on said aqueous solution which is sufficient to force a volume of said solution into cracks or openings in the formation into contact with finely divided siliceous materials contained within said cracks or openings which is substantially in excess of the volume of fluid which would leak into the formation as a result of the pressure of a column of said solution disposed in said well bore;

maintaining a pressure on said solution to maintain quiescent contact between said solution and said finely divided particles for a sufficient time under the temperature conditions within the formation to enlarge the finely divided siliceous particles through surface reaction with the aqueous solution to increase their agglomerated volume in the order of 2:1 or greater.

2. The method of claim 1 wherein said alkaline earth metal hydroxide is strontium hydroxide.

3. The method of claim 2 wherein said alkaline earth metal hydroxide is barium hydroxide.

4. The method of claim 1 wherein the pressure exerted on the aqueous solution is sufficient to fracture the subsurface earth formation.

5. A method for treating sanded oil wells by agglomerating and increasing the size of finely divided discrete siliceous particles that are free to move in a subsurface earth formation to convert the finely divide particles to an agglomerated condition such that the particles do not move to form a close-packed obstruction which impedes the flow of oil from the formation to a producing well, said method comprising:

injecting into a well bore penetrating the formation an aqueous solution of calcium hydroxide having a pH of about 10.5 or greater;

exerting a pressure on said aqueous solution which is sufficient to force a volume of said solution into cracks or openings in the formation into contact with finely divided siliceous materials contained within said cracks or openings which is substantially in excess of the volume of fluid which would leak into the formation as a result of the pressure of a column of said solution disposed in said well bore;

maintaining a pressure on said solution to maintain quiescent contact between said solution and said finely divided particles for a sufficient time under the temperature conditions within the formation to enlarge the finely divided siliceous particles through surface reaction with the aqueous solution to increase their agglomerated volume in the order of 2:1 or greater.

6. The method of claim 5 wherein said solution is saturated with calcium hydroxide.

7. The method of claim 5 wherein said solution contains a water soluble organic or inorganic salt which does not form an insoluble precipitate with calcium hydroxide, said salt being present in an amount which is effective to increase the solubility of the calcium hydroxide.

8. The method of claim 7 wherein said salt is sodium chloride at a concentration ranging up to about 6 percent by weight.

9. The method of claim 5 wherein said solution contains glycerol in an amount ranging up to about 6 percent by weight which is effective to increase the solubility of the calcium hydroxide.

10. The method of claim 5 wherein the pressure exerted on said solution is sufficient to promote the contact of siliceous particles within the formation to assist in the consolidation of adjacent particles.

11. The method of claim 5 wherein the temperature within the formation is 150°F or higher.

* * * * *